United States Patent [19]
Takada et al.

[11] Patent Number: 6,073,669
[45] Date of Patent: Jun. 13, 2000

[54] HEAVY DUTY PNEUMATIC TIRE WITH AN ADHESIVE RUBBER LAYER BETWEEN THE INNER LINER AND THE CHAFER

[75] Inventors: Yoshiyuki Takada, Kobe; Takako Kitamura, Nara-ken, both of Japan

[73] Assignee: Sumitomo Rubber Industries, Ltd., Hyogo-ken, Japan

[21] Appl. No.: 09/086,530

[22] Filed: May 29, 1998

[30] Foreign Application Priority Data

May 30, 1997 [JP] Japan .................................. 9-142137

[51] Int. Cl.$^7$ ............................................ B60C 15/00
[52] U.S. Cl. ..................... 152/510; 152/539; 152/543; 152/547
[58] Field of Search ....................... 152/510, 539, 152/543, 565, 547, 549, 564

[56] References Cited

U.S. PATENT DOCUMENTS 5,058,649  10/1991  Hoang et al. ........................ 152/539

FOREIGN PATENT DOCUMENTS

47002/85   3/1986  Australia ................................ 152/511
0448905A1  2/1991  European Pat. Off. ............... 152/543

*Primary Examiner*—Michael W. Ball
*Assistant Examiner*—Barbara Musser

[57] ABSTRACT

A heavy duty pneumatic tire comprises a pair of bead portions with a bead toe, a bead core disposed in each bead portion, a carcass comprising at least one ply of cords extending between the bead portions and turned up around the bead cores, an inner liner made of an airtight rubber compound disposed inside the carcass along the inner surface of the tire, the inner liner extending from one of the bead portion to the other and terminating before the bead toe, a chafer made of a hard rubber compound disposed in each bead portion along the bead base, the chafer extending axially inwardly to the bead toe, and an adhesiveness improvement rubber layer disposed between inner liner and chafer.

6 Claims, 3 Drawing Sheets

HEAVY DUTY PNEUMATIC TIRE WITH AN ADHESIVE RUBBER LAYER BETWEEN THE INNER LINER AND THE CHAFER

The present invention relates to a heavy duty pneumatic tire, more particularly to an improved bead structure being capable of preventing separations of the airtight inner liner during rim-mounting/demounting operations.

In the pneumatic tires for heavy duty vehicles such as trucks, buses and the like, as the tire pressure is very high and the tire load is heavy, the engaging force between the tire bead portions and wheel rim is designed to be very large. Therefore, in order to withstand such a large force, a chafer (d) is disposed along the surface of the bead portion as shown in FIG. 3. The chafer (d) is usually made of a hard rubber compound having a JIS(A) hardness of more than 75 degrees. On the other hand, the chafer (d) is connected at the radially outer end of the axially inner part with the radially inner end of the inner liner (e) made of airtight rubber. In general, such airtight rubber is softer than the chafer rubber and the components are quite different. as a result, the boundary (k) between them is relatively weak in adhesivity. Therefore, when a large force F is applied to the bead toe portion (a) by the rim flange during mounting or demounting the tire, a separation failure is liable to occur along the boundary (k). The separation, if once occurred, extends easily into the bead portion. Thus, the bead durability is degraded, and it becomes impossible to retread the tire. Further, the separation often reaches to steel cords (f) of the reinforcing plies (f), (g), and the steel cords are rusted, which further degrades the durability.

It is therefore, an object of the present invention to provide a heavy duty pneumatic tire in which separation of the inner liner during mounting and demounting operations can be effectively prevented to improve the bead durably and to increase the retread rate of used tires.

According to the present invention, a heavy duty pneumatic tire comprises a pair of bead portions with a bead core therein, a carcass comprising at least one ply of cords extending between the bead portions and turned up around the bead cores, an inner liner made of an airtight rubber compound disposed inside the carcass along the inner surface of the tire, the inner liner extending from one of the bead portion to the other and terminating before the bead toe, a chafer made of a hard rubber compound disposed in each bead portion along the bead base, the chafer extending axially inwardly to the bead toe, and an adhesiveness improvement rubber layer disposed between the inner liner and the chafer.

Preferably, the adhesiveness improvement rubber layer is made of a rubber compound of which rubber base is natural rubber.

An embodiment of the present invention will now be described in detail in conjunction with the accompanying drawings.

A heavy duty pneumatic tire according to the present invention comprises a tread portion, a pair of sidewall portions, a pair of bead portions 1 with a bead core 1a therein, and a toroidal carcass 2 extending between the bead portions 1 through the tread portion and sidewall portions, a tread reinforcing belt comprising for example steel cord breaker plies disposed on the radially outside of the carcass and under the tread, and an airtight inner liner 3 extending along the inner surface of the tire.

Figure 1:
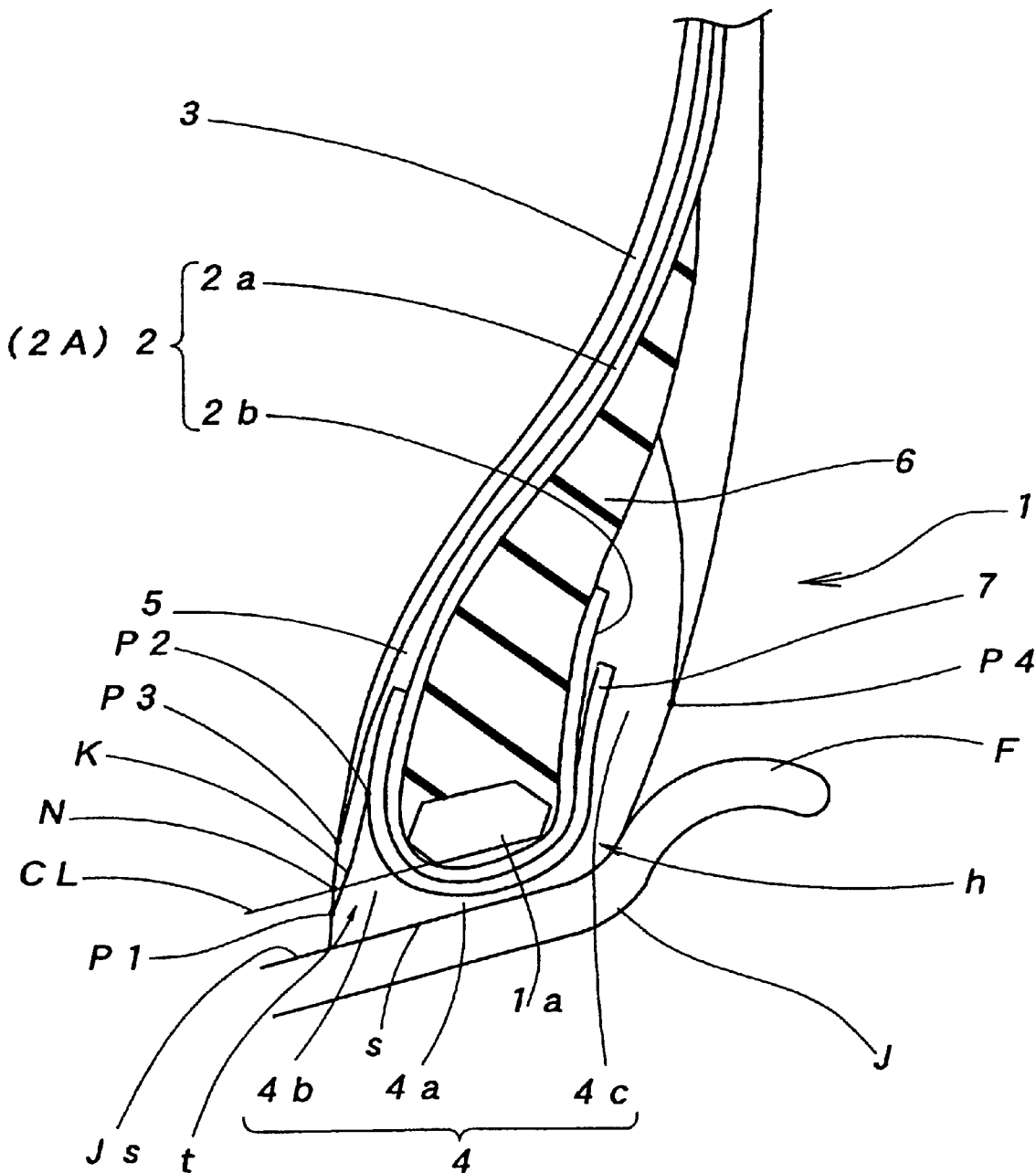
FIG. 1 is a cross sectional view of an example of the bead portion of a tire according to the present invention which is mounted on a standard rim.
Figure 2:
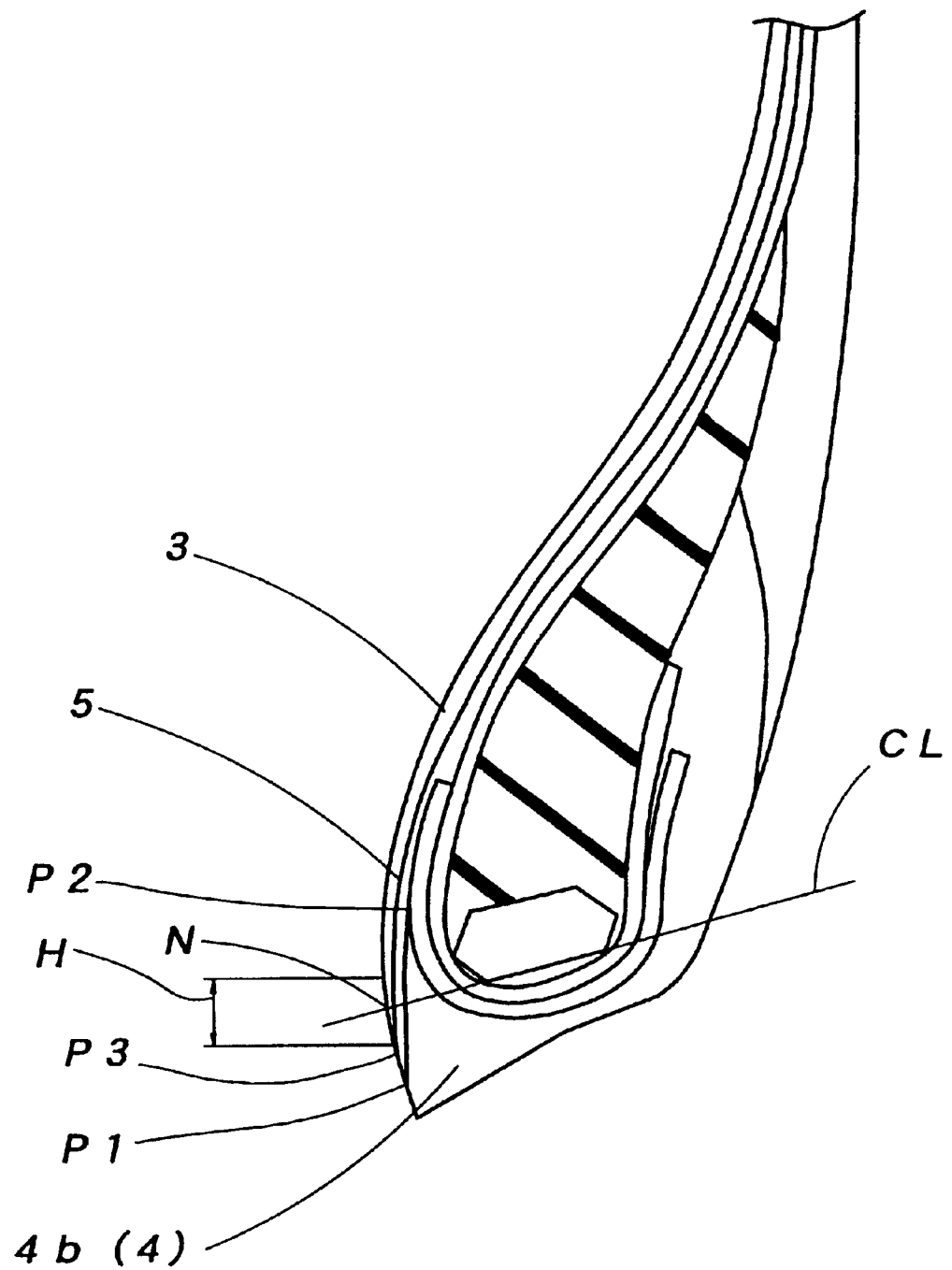
FIG. 2 is a cross sectional view of the bead portion when the tire is not mounted on the rim.

In this example, the tire is a truck/bus tire which is accommodated to a 150° taper center drop rim J. FIG. 1 shows a state (hereinafter mounted state) of the bead portion 1 when the tire is mounted on the standard rim J and inflated to a standard pressure. FIG. 2 shows a state (hereinafter unmounted state) of the bead portion 1 when the tire is not mounted on the rim.

Here, the standard rim is the "standard rim" specified in JATMA, the "Measuring Rim" in ETRTO, the "Design Rim" in TRA or the like. The standard pressure is the "Maximum air pressure" in JATMA, the "Inflation Pressure" in ETRTO, the maximum pressure given in the "Tire Load Limits at Various Cold Inflation Pressures" table in TRA or the like.

The carcass 2 comprises at least one ply in this example only one ply 2A of cords arranged radially at an angle of from 70 to 90 degrees with respect to the tire equator and extending between the bead portions 1 and being turned up around the bead core la from the axially inside to outside of the tire in each bead portion 1 to form a turnup portion 2b and a main portion 2a between the turnup portions 2b. For the carcass cords, steel cords are used in this example. But, organic fiber cords such as polyester, nylon, aromatic polyamide rayon, and the like may be used.

The bead core 1a in this example is made of windings of a steel wire, and the cross sectional shape is a flattened hexagon of which the radially inner side is inclined at the substantially same angle as the taper angle of the bead seat Js of the rim J, namely, an angle of about 15 degrees with respect to the axial direction. Aside from the steel wire, aromatic polyamide cords may be used.

Between the carcass ply main portion 2a and turnup portion 2b in each bead portion 1, a bead apex 6 tapering radially outwardly from the bead core 1a is disposed. The bead apex 6 is preferably made of a rubber having a JIS(A) hardness of 65 to 98 degrees, more preferably 70 to 95 degrees.

Further, in this example, each bead portion 1 is provided with a reinforcing layer 7 extending from the axially inside to outside of the bead core to wrap the main portion 2a and turnup portion 2b. This layer 7 is composed of a single ply of steel cords. It is however possible to use organic fiber cords.

The above-mentioned inner liner 3 is disposed along the inner surface of the tire except the bead toe portion (t). Thus the radially inner end P3 thereof is positioned radially outward of the bead toe.

The inner liner 3 is made of an airtight rubber compound of which rubber base is butyl rubber such as isobutylen-isoprene rubber, halogenated isobutylen-isoprene rubber, brominated isobutylen-isoprene rubber, chlorinated isobutylen-isoprene rubber and the like. In this example, brominated isobutylen-isoprene rubber is used.

Further, a chafer 4 is disposed in the bead portion 1. The chafer 4 is made of a hard rubber compound of which rubber base is a blend of 20 to 80 parts by weight of natural rubber and 80 to 20 parts by weight of butyl rubber (total=100 parts), and the JIS(A) hardness thereof is 75 to 86 degrees, preferably 75 to 83 degrees.

The chafer 4 comprises a base portion 4a located radially inside the bead core 1a to define the bead base (s), an axially inner portion 4b extending radially outwardly from the axially inner end of the base portion 4a to define the inner surface of the tire in the bead toe portion (t), and an axially outer portion 4c extending radially outwardly from the axially outer end of the base portion 4a to define the outer surface of the tire in the bead heel portion (h).

The outer portion 4c tapers radially outwardly and extends beyond the carcass turnup end. This tapered portion is spliced with the tapered radially inner end portion of a sidewall rubber 9 having a JIS(A) hardness smaller than the chafer 4. In this spliced part, the sidewall rubber is axially outside. On the outer surface of the tire, the radially outer edge P4 of the chafer 4 is positioned radially outward of the radially outer edge of the region which contacts with the flange F of the rim J, whereby a damage due to contact with the flange F can be prevented.

The axially inner portion 4b tapers radially outwardly, and the radially outer end thereof overlaps the radially inner end of the inner liner 3. But they do not contact each other directly. Between them, an adhesiveness improvement rubber 5 is disposed to prevent separation of the inner liner 3.

The adhesiveness improvement rubber 5 is made of a rubber compound of which rubber base is natural rubber.

In this example, the adhesiveness improvement rubber 5 extends continuously between the bead portions through the sidewall portion to prevent the inner liner 3 from directly contacting with the carcass ply.

On the inner surface of the tire, the boundary P1 between the chafer 4 and the adhesiveness improvement rubber 5, that is, the radially outer edge of the chafer 4 is positioned radially inward of a bead core base line CL in the above-mentioned mounted state. The bead core base line CL is a straight line passing through the radially inner most point of the bead core 1a in parallel with the bead seat Js of the rim J. In this example, accordingly, the bead core base line is inclined at 15 degrees to the axial direction and further the line CL coincides with the above-mentioned radially inner side of the hexagon of the bead core.

The vicinity (about 3 mm radially outwards and inwards) of the intersecting point N of the bead core base line CL and the inner surface line of the tire is liable to be subjected to a large force when the tire is mounted on or demounted from the rim.

Therefore, the boundary P1 is preferably positioned at least 3 mm inward of the point N.

On the other hand, the radially outer end P2 of the boundary K between the inner portion 4b and the adhesiveness improvement rubber 5 is positioned radially outward of the bead core base line CL, preferably being at least 3 mm distant from the bead core base line CL.

Figure 3:
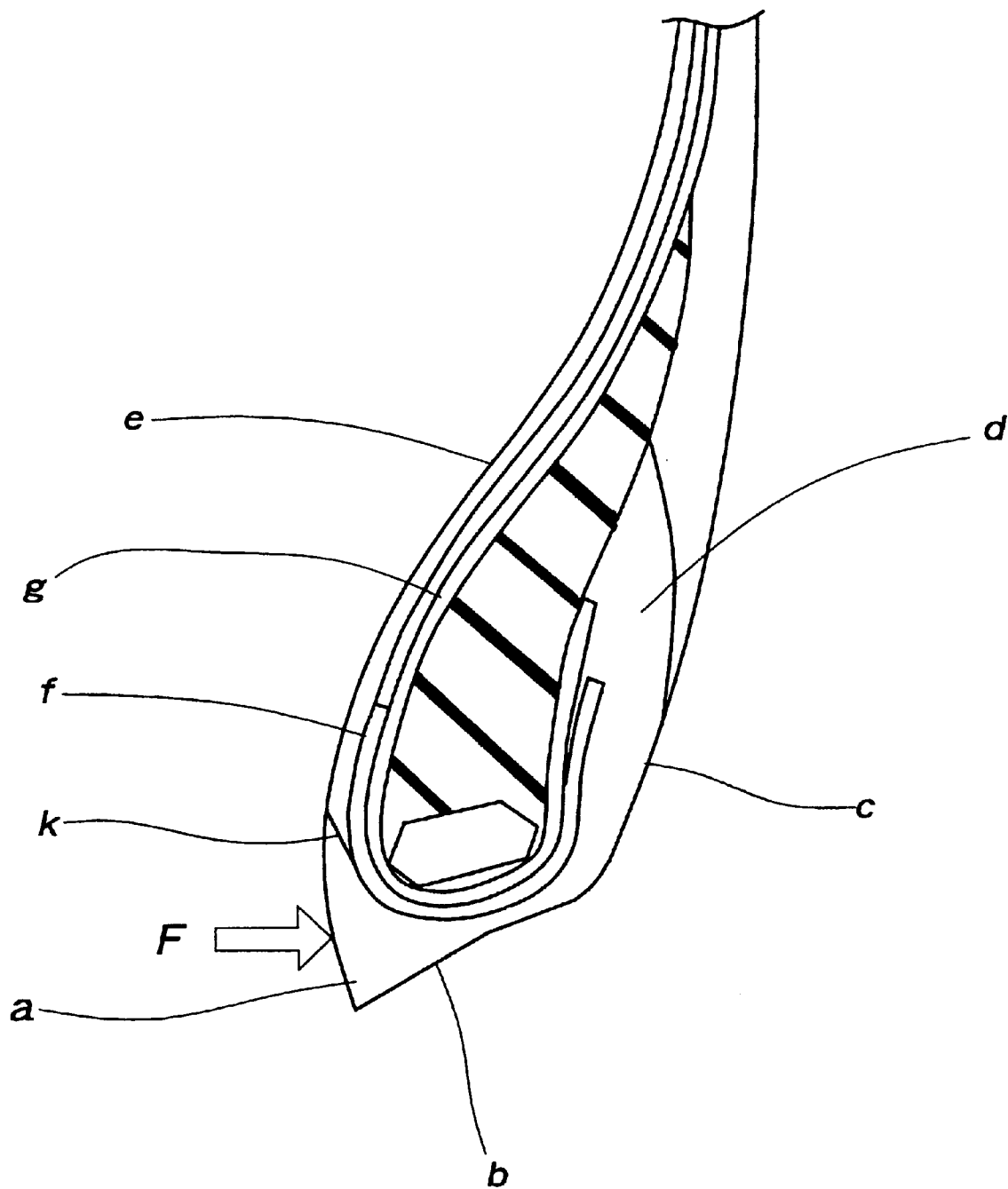
FIG. 3 is a cross sectional view of a bead portion according to prior art.

In the tire meridian section in both of the mounted state and unmounted state, the boundary line K is inclined radially outwards in contrast with the boundary line (k) of the conventional tire shown in FIG. 3. And the radially inner edge P3 of the inner liner 3 is between the points P1 and P2 in the radial direction.

Comparison Test

As test tires (size 11R22.5), new tires and used tires run over 50000 km and thus finished one life cycle were prepared and tested for the bead durability or strength.

The specifications of the inner liner, chafer and adhesiveness improvement rubber layer (A.I.R.) are as follows.

TABLE 1

|  | Inner liner | A.I.R. | Chafer |
|---|---|---|---|
| Rubber base |  |  |  |
| NR | — | 100 | 40 |
| BR-IIR | 100 | — | — |
| polybutadiene* | — | — | 60 |
| Carbon |  |  |  |
| GPF | 65 | — | — |
| HAF | — | — | 65 |
| LS-ISAF | — | 45 | — |
| Oil | 13 | 6 | — |
| Resin | 4 | 3 | — |
| Age resistor | — | 1.5 | 4 |
| Stearic acid | 1.2 | 2 | 2 |
| Hydrozincite | 3 | 6 | 3 |
| Sulfur | 0.5 | 2.5 | 1 |
| Accelerator | 1.5 | 0.7 | 3 |

*syndiotactic polybutadiene
UBE-KOUSAN, UBEPOL VCR412

In the test, the tires were repeatedly subjected to rim-mounting/demounting operations, using a hydraulic tire changer.

The wheel rim used was an aluminum wheel rim (size 7.50X22.5) of which flange was relatively thick and the top thereof was coarse from long time use—therefore it was relatively difficult for the bead portions to pass over the flange top. Then, the tires were inspected for separations of the inner liner and tears of the bead toe to evaluate whether the tire was retreadable or not. The test results are as follows.

TABLE 2

| Tire | Ex. | | Prior art | |
|---|---|---|---|---|
| state | new | used | new | used |
| Bead | FIG. 2 | FIG. 2 | FIG. 3 | FIG. 3 |
| Chafer |  |  |  |  |
| JIS(A) hardness | 80 | 88 to 91 | 80 | 88 to 91 |
| Diameter of Bead portion (mm) | 543 | 552 to 558 | 543 | 551 to 555 |
| Retread* |  |  |  |  |
| impossible | 0 | 0 | 4 | 5 |
| possible | 5 | 5 | 1 | 0 |

*The number of tires is indicated.

The total number of the tires was five each.

The "retreadable" tire means that there is no separation and the tear is less than 10 mm width inclusive of zero.

From the test, it was confirmed that all of the example tires were retreadable in both the new and used states. Especially, there was no tear in the new tires. As to the used tires, there was no tear in three of them. In the remaining two tires, only small tears less than 10 mm width occurred. The reason for the occurrence of small tears is conjectured that the JIS(A) hardness of the chafer in the used tires was 8 to 11 degree increased from that in the new state.

In the prior art, even in the new tires, four of the five tires were not retreadable. As to three of them, tears of over 50 mm width and separations of inner liner were caused. As to one of them, tears and separation were more heavy and the reinforcing cords were exposed. As to the remaining retreadable one, only small tears of less than 10 mm width were caused. As to the used tires, none of them was retreadable. In three of them, separations of the inner liner were caused. In the remaining two, tears of over 50 mm width and separations were caused.

What is claimed is:

1. A heavy duty pneumatic tire comprising
a pair of bead portions with a head toe,
a bead core disposed in each bead portion,
a carcass comprising at least one ply of cords extending between the bead portions and turned up around the bead cores,
an inner liner made of an airtight rubber compound disposed inside said carcass along the inner surface of the tire, said inner liner extending from one of the bead portions to the other and terminating before the bead toe,
a chafer made of hard rubber compound disposed in each bead portion, said chafer extending from the axially outer surface of the bead portion to the bead toe, and
an adhesiveness improvement rubber layer disposed between said inner liner and said chafer, on the inner surface of the tire,
a first boundary between the chafer and the adhesiveness improvement rubber layer being positioned on the radially inside of a bead core base line, and
a second boundary between the inner liner and the adhesiveness improvement rubber layer being positioned radially outward of the first boundary.

2. The heavy duty pneumatic tire according to claim 1, wherein
the adhesiveness improvement rubber layer is made of a rubber compound of which rubber base is natural rubber.

3. The heavy duty pneumatic tire according to claim 1 wherein
the chafer is made of a rubber compound of which rubber base is a blend of 20 to 80 parts by weight natural rubber and 80 to 20 parts by weight butyl rubber, and the JIS(A) hardness of the chafer is 75 to 95 degrees.

4. The heavy duty pneumatic tire according to claim 1, wherein
the boundary between the chafer and the adhesiveness improvement rubber layer has
a radially outer end which is positioned on the radially outside of the bead core base line.

5. The heavy duty pneumatic tire according to claim 4, wherein
said second boundary is positioned on the radially outside of the bead core base line and radially inward of said radially outer end.

6. The heavy duty pneumatic tire according to claim 1, wherein
the inner liner is made of a rubber compound of which rubber base is butyl rubber,
the adhesiveness improvement rubber layer is made of a rubber compound of which rubber base is natural rubber, and
the chafer is made of a rubber compound of which rubber base is a blend of 20 to 80 parts of weight natural rubber and 80 to 20 parts by weight butyl rubber.

* * * * *